Oct. 11, 1960     E. LINSKER     2,955,492
AUTOMATIC TOOL

Original Filed March 18, 1957     2 Sheets-Sheet 1

INVENTOR.
EUGENE LINSKER
BY
*Marechal, Biebel, French & Bugg*
ATTORNEYS

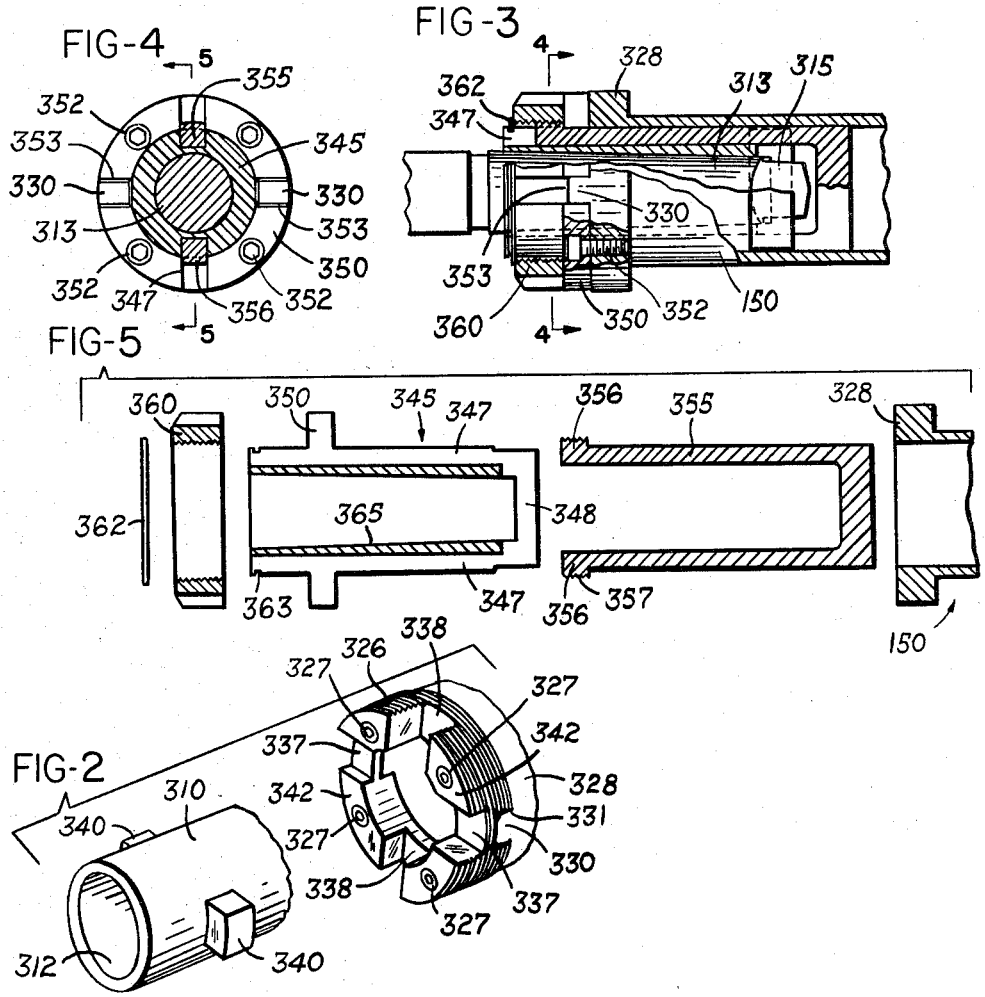

United States Patent Office 2,955,492
Patented Oct. 11, 1960

2,955,492
AUTOMATIC TOOL

Eugene Linsker, Dayton, Ohio, assignor to Buckeye Tools Corporation, Dayton, Ohio, a corporation of Ohio Original application Mar. 18, 1957, Ser. No. 646,722, now Patent No. 2,893,272, dated July 7, 1959. Divided and this application May 7, 1959, Ser. No. 811,579

2 Claims. (Cl. 77—55)

This invention relates to automatic machine tools, especially of the portable type, and particularly to improved tool holder adapters for such tools.

This application is a division of my pending application Serial No. 646,722, filed March 18, 1957, now patent No. 2,893,272, issued July 7, 1959. In that parent application a machine tool is disclosed and claimed including a rotating spindle which is also capable of controlled linear or feeding movement. The spindle is arranged to drive a cutting tool, and includes adapters for holding, and for facilitating removal of, cutting tools having a tapered shank.

Accordingly, the primary object of this invention is to provide an improved tool holder adapter for retaining the cutting tools in the work spindle of such a machine tool, and providing for release of the tapered shanks of cutting tools and the like from the machine with a minimum of effort.

A further object of the invention is to provide such tool holder adapters wherein the tapered shanks of cutting tools may be released for their removal and replacement without disassembling the adapter from its mounting on the machine tool.

Other objects and advantages of the invention will be apparent from the following description, the accompanying drawings and the appended claims.

In the drawings—

Fig. 2 is a perspective view of parts of the tool holder adapter shown in section in Fig. 1;

Fig. 3 is a view, partly in section and partly in elevation, of a modified cutting tool holder provided by this invention;

Fig. 4 is a sectional view taken on line 4—4 in Fig. 3; and

Fig. 5 is an exploded vertical section through the modified tool holder, taken on line 5—5 in Fig. 4.

Figure 1:
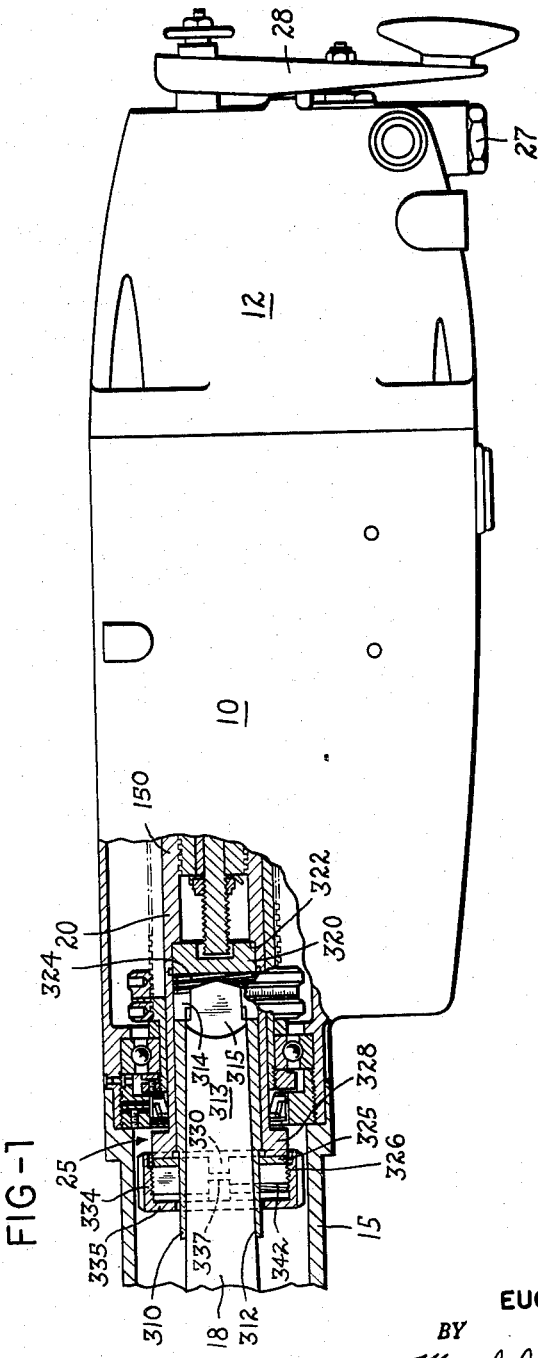
Fig. 1 is a side plan view of a portable machine tool to which the invention is related, including parts broken and in section showing the location of the tool holder adapter and its relation to other parts of the machine tool.

Referring to the drawings, which illustrate preferred embodiments of the present invention, Fig. 1 is a view of the assembled portable machine tool provided by this invention, shown as including a housing divided into complementary sections including a drive section indicated generally at 10 and a control section 12, these sections normally being connected by bolts (not shown). The drive section 10 houses the drive parts of the tool, as described more fully in said copending application, and to one end of housing 10 a generally tubular nosepiece 15 may be attached. A cutting tool 18, of any suitable type for performing a desired machining operation, is mounted in the end of a spindle 20 by means of a tool holder adapter, indicated by the general reference numeral 25. This cutting tool may be, for example, a drill, a reaming tool, a boring cutter, or a suitable tool for performing counterboring, countersinking, spot facing and similar machine operations.

The control section 12 includes a fitting 27 for attachment to a suitable source of power fluid, as in the case of a tool having a pressure fluid operated drive motor, and this section also carries the control arm or lever 28 which functions in cooperation with parts of the control section to govern the operation of the tool to rotate and to move the spindle in a linear direction, as more fully described in said aforementioned application.

The present invention relates particularly to novel tool holder adapters for mounting conventional taper shank cutting tools, or the tapered shank of a chuck, in the end of work spindle 20. One such adapter is shown in Figs. 1 and 2, and includes an adapter socket 310 having a tapered inner surface 312 for receiving and frictionally retaining the tapered socket 313 at the end of a suitable cutting tool such as drill 18 (Fig. 1). The rearward end of socket 310 includes a slot 314 which receives a tang 315 on the end of the tapered tool 313. Within the end of work spindle 150 there is a plate 320 seated against a shoulder 322, and preferably made of a hardened material. A light ejector spring 324 may be inserted between the end of socket 310 and plate 320 if desired.

An adapter ring 325 having a threaded exterior surface 326 is connected by bolts 327 to the enlarged end 328 of work spindle 150, and suitable lugs or dogs 330 extend from the enlarged end 328 into mating slots 331 to transmit the driving force and take the majority of the load off bolts 327. A retaining ring 334 is threaded over the exterior of adapter ring 325, and includes a flange 335 which serves to retain socket 310 in position within the work spindle. The forward face of adapter ring 325 is provided with two sets of mating slots, as shown in Fig. 2, the first set 337 are relatively shallow, and are shown as axially aligned with the slots 331 in the back face of the ring. The other set of slots 338 are located 90° from the first set 337, and are substantially deeper than the slots 337 as will be apparent from an inspection of Figs. 1 and 2. A pair of ears 340 extend from the surface of socket 310, spaced 180° apart, for reception alternately in one or the other of these sets of shallow and deep slots, and these ears 340 are held in the desired slots by flange 335.

The purpose of this arrangement is to provide a means of readily unseating the locked tapered parts of the socket and tool shank, this normally being a somewhat difficult operation since these two parts are located in a blind hole within the end of the work spindle, and since it is considered time consuming to remove the entire socket merely for removal of the cutting tool. Assuming that a cutting tool is in place and in need of replacement, and assuming lugs 340 to be in the shallow slot 337, in the position shown in Fig. 1, the tool may be easily removed from the socket by loosening retaining ring 334 to permit the socket 310 to be withdrawn sufficiently for the lugs or ears 340 to pass over the lower front parts 342 of the adapter ring. The socket is then rotated 90° to align lugs 340 with the deeper slots 338 and retaining ring 334 is tightened, forcing the tang 315 of the drill against the plate 320, and breaking the tight frictional engagement between the locked tapered parts 313 and 312. The socket is then returned to the normal drive position as illustrated in Fig. 1 before a new cutting tool is placed therein.

Another tool adapter provided by this invention is shown in Figs. 3–5, and includes a socket 345 having opposed axially extending slots 347 in its outer surface, these slots being joined by a cross slot 348 at the inner end of the socket. A circular shoulder 350 on the socket is adapted to a secured by bolts 352 to the end 328 of the work spindle 150, and the lugs 330 extending from the work spindle are received within slots 353 in the shoulder portion. A generally U-shaped draw bar 355 is received within the slots 347 and 348 of socket 345, and the enlarged head parts 356 of the draw bar are threaded at 357 to engage the threaded interior of a draw bar nut 360. This nut is received over the end of socket 345 and retained in position thereon against the front face of shoulder 350 by a suitable snap ring 362 received in an annular slot 363 at the end of the socket.

When the tapered shank 313 of a cutting tool is received within the tapered inner surface 365 of the socket the tank 315 extends through the rearward slot 348, and draw bar 355 is backed into the work spindle to provide adequate room for a positive engagement between these complementary tapered parts. When it is desired to release the cutting tool, nut 360 is rotated to pull draw bar 355 forward, engaging tang 315 and breaking the tight frictional engagement between the locked tapered parts 313 and 365.

While the forms of apparatus herein described constitute preferred embodiments of the invention, it is to be understood that the invention is not limited to these precise forms of apparatus, and that changes may be made therein without departing from the scope of the invention as defined in the appended claims.

What is claimed is:

1. In a machine tool the combination of a housing, a work spindle, means mounting said work spindle for rotational movement in said housing, one end of said spindle projecting exteriorly of said housing and including a socket for receiving a cutting tool, an adapter member secured in said socket and including a tapered inner surface for receiving a complementary tapered shank portion of a cutting tool, said adapter including an aperture at its inner end for passage of a tang at the end of the tool shank portion, means supporting the inner end of said adapter normally in spaced relation with respect to the bottom of said socket sufficient to prevent contact between the tang of a cutting tool and the bottom of said socket, and means for forcing said adapter into said socket beyond the normal position thereof to cause the tang of the cutting tool to engage the bottom of said socket and thus to free the frictional engagement between the tapered shank of the cutting tool and said tapered inner surface of said adapter member.

2. A tool holder adapter for mounting cutting tools in the tool holding socket of a machine tool, comprising the combination of an adapter member having a tapered inner surface for receiving a complementary tapered shank portion of a cutting tool, said adapter including an aperture at its inner end for passage of a tang at the end of the tool shank portion, means for mounting said adapter member in the socket with said inner end thereof normally spaced sufficiently from the bottom of said socket to prevent pressure contact between the tang of a cutting tool and the bottom of the socket, and means for forcing said adapter member into said socket beyond said normal position thereof to engage the tang with the bottom of the socket and thus to exert sufficient force on the cutting tool to free the frictional engagement between its shank and said tapered inner surface of said adapter member.

References Cited in the file of this patent

UNITED STATES PATENTS

| 728,276 | Muehlberg | May 19, 1903 |
| 762,647 | Mullinnix | June 14, 1904 |

FOREIGN PATENTS

| 239,253 | Switzerland | Jan. 3, 1946 |